(No Model.) 4 Sheets—Sheet 1.
G. PASSONI.
MACHINE FOR MAKING BOLTS AND RIVETS.
No. 539,590. Patented May 21, 1895.
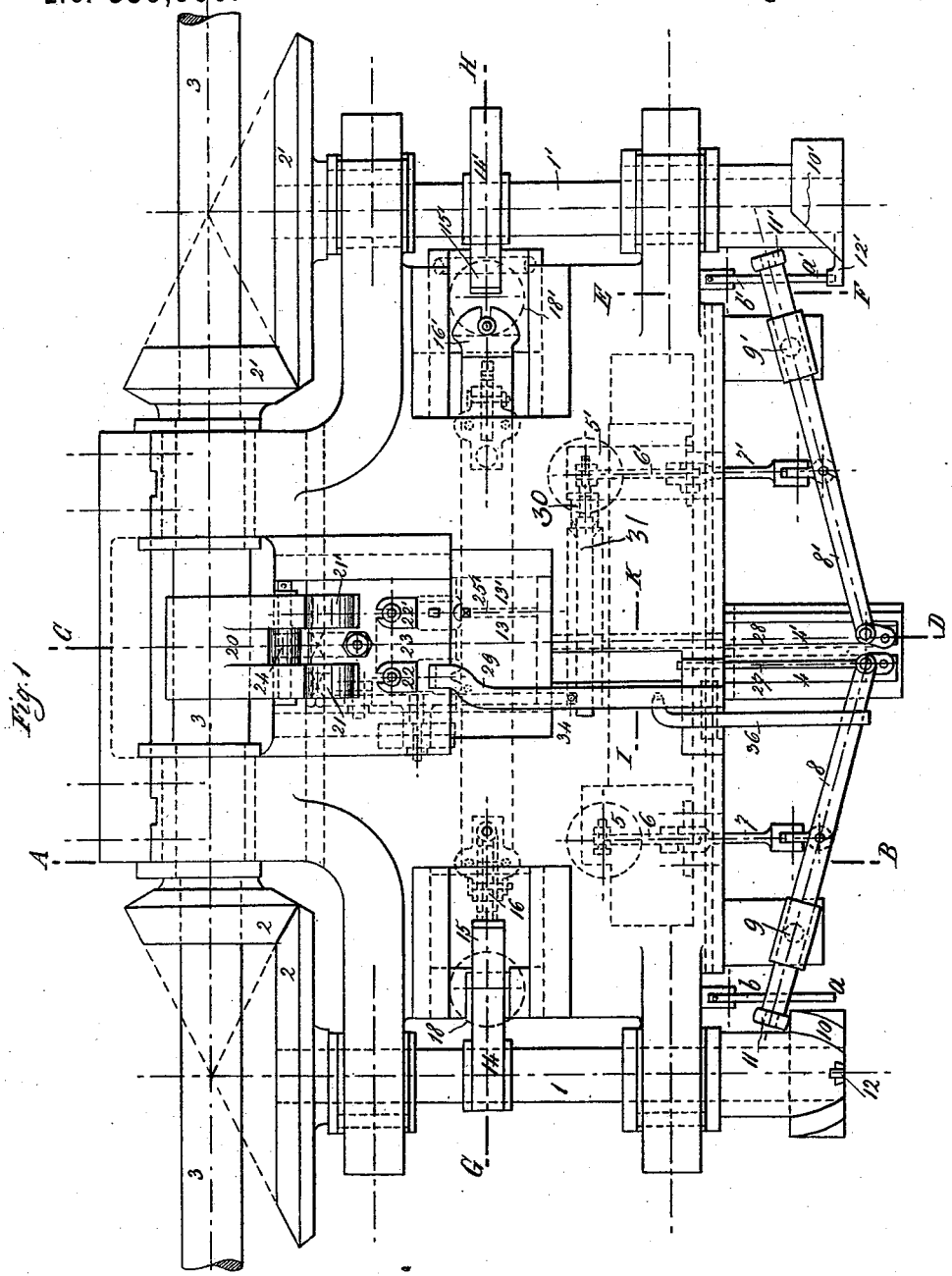
Witnesses:
H. van Oldenneel
a. S. Büsing
INVENTOR,
Giovanni Passoni
by Richardson
his Attorneys
THE NORRIS PETERS CO., PHOTO-LITHO., WASHINGTON, D. C.

(No Model.) 4 Sheets—Sheet 2.
G. PASSONI.
MACHINE FOR MAKING BOLTS AND RIVETS.
No. 539,590. Patented May 21, 1895.
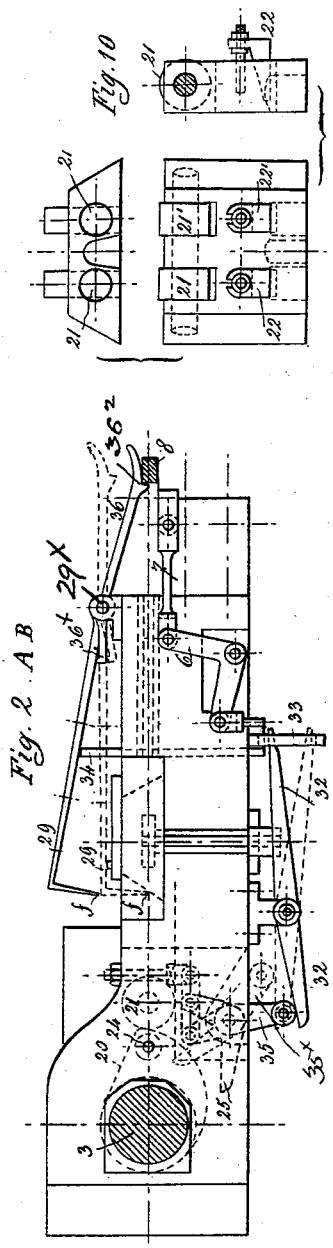
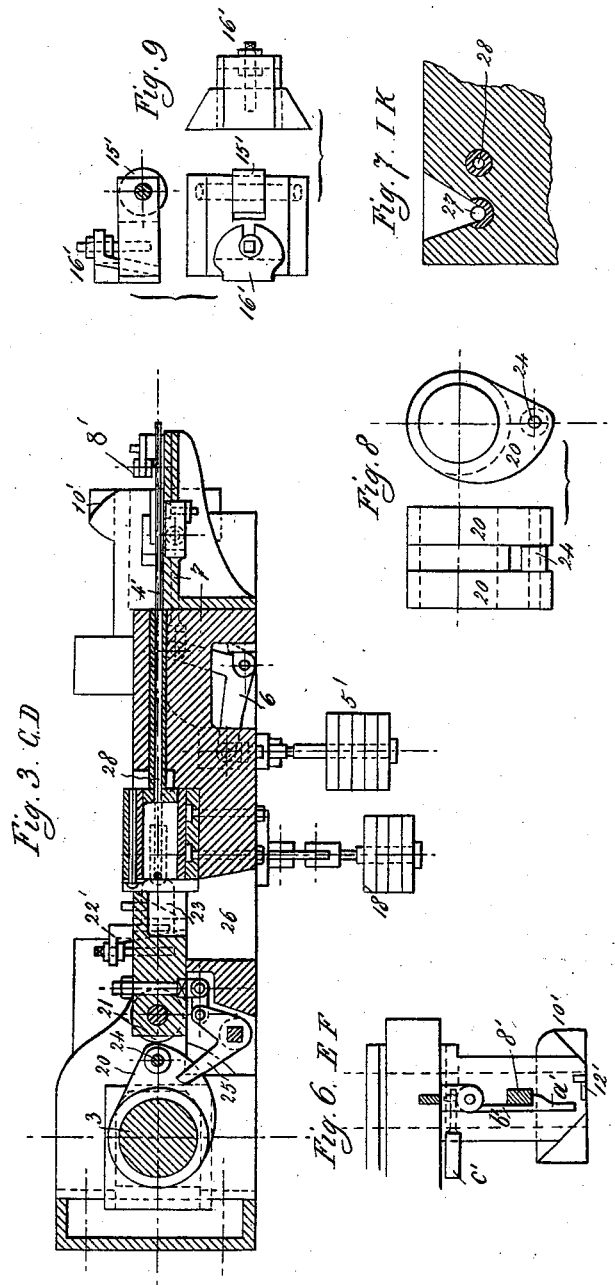
Witnesses:
H. van Oldenneel
A. S. Büsing
INVENTOR.
Giovanni Passoni
by Richardson
his Attorneys (No Model.) 4 Sheets—Sheet 3.
G. PASSONI.
MACHINE FOR MAKING BOLTS AND RIVETS.
No. 539,590. Patented May 21, 1895.
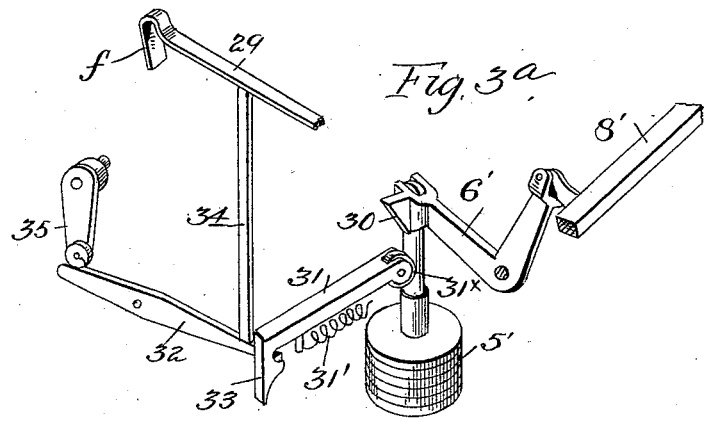
Fig. 3ª.
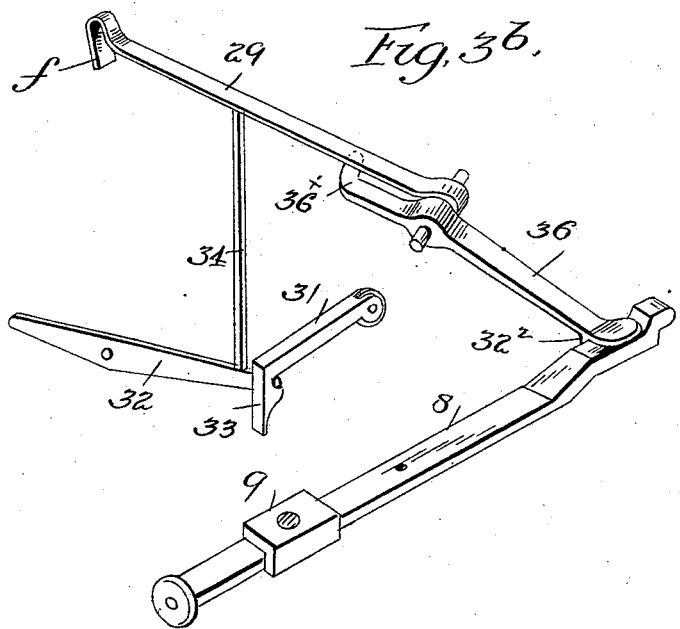
Fig. 3ᵇ.
Attest
Walter Mulasy
J. M. Spear
Inventor
Giovanni Passoni
by Richards & Co.
Attys.

(No Model.) 4 Sheets—Sheet 4.
G. PASSONI.
MACHINE FOR MAKING BOLTS AND RIVETS.
No. 539,590. Patented May 21, 1895.
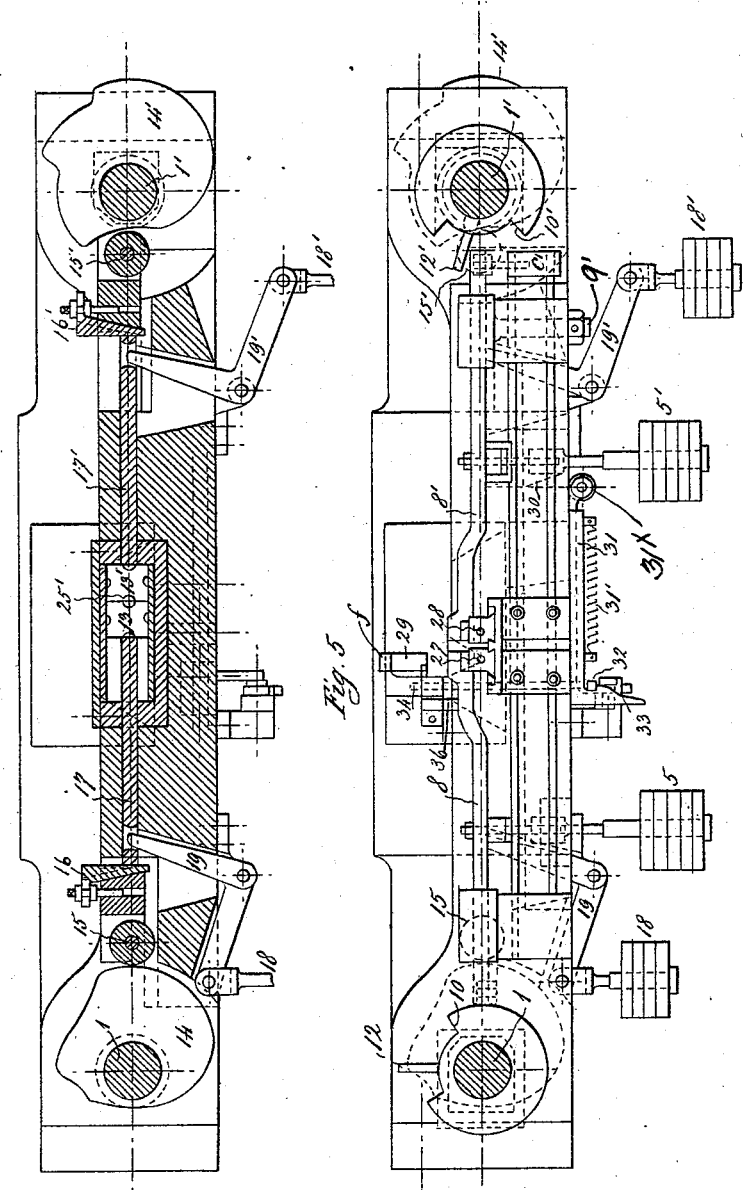
Witnesses:
H. van Oldenneel
A. S. Büsing
INVENTOR.
Giovanni Passoni
by Richards
his Attorneys

UNITED STATES PATENT OFFICE.

GIOVANNI PASSONI, OF MILAN, ITALY.

MACHINE FOR MAKING BOLTS AND RIVETS.

SPECIFICATION forming part of Letters Patent No. 539,590, dated May 21, 1895.

Application filed September 14, 1894. Serial No. 523,039. (No model.) Patented in Italy December 23, 1893, LXIX, 202, and in Belgium June 15, 1894, No. 110,255.

*To all whom it may concern:*

Be it known that I, GIOVANNI PASSONI, a subject of the King of Italy, and a resident of Milan, Italy, have invented certain new and useful Improvements in Machines for Manufacturing Bolts and Rivets, of which the following is a specification.

The invention has been patented in Italy December 23, 1893, Vol. 69, No. 202, and in Belgium June 15, 1894, No. 110,255.

In my improved machine for stamping and forging bolts and rivets, more especially carriage bolts, the bar heated to a white heat receives two successive blows, whereby I am enabled to produce bolts and rivets of any dimensions required in commerce by a single heating of the heads.

This machine is characterized by the employment of a shaft, to which rotary movement is imparted, for operating the stamps by means of cams which communicate to them a positive movement so as to obviate the shocks which are produced in the ordinary forging machines. Rotary shafts also place alternately in front of the stamp either the rough iron bar or the bar which has already received a first blow, which shafts also actuate mechanism to introduce into the machine the bar to be forged and discharge the finished piece.

Figure 1 is a general plan view of the machine, seen from above. Fig. 2 is a transverse section of the same on the line A B of Fig. 1. Fig. 3 is a transverse section on the line C D of Fig. 1. Fig. 3ª is a detail perspective view of the stop means for controlling the introduction of the rough bar. Fig. 3ᵇ is a further detail view of said mechanism. Fig. 4 is a longitudinal section on the line G H of Fig. 1.
Fig. 5 is a side elevation of the machine where the operator stands and where the rough rod is introduced, the shafts 1 1' being in section. Fig. 6 is a sectional view on the line E F of Fig. 1. Fig. 7 is a sectional view on the line I K of Fig. 1; and Figs. 8, 9, and 10 are views of details of construction.

On the two sides of the machine are arranged two shafts 1, 1' which carry similar parts arranged symmetrically. Two pairs of bevel wheels (2, 2) (2', 2') keyed to the extremities of the shafts 1, 1' actuate a longitudinal shaft 3 arranged at the rear part of the machine, that is to say, at the part opposite to that where the workman is and from where the rough bar is introduced. The number of revolutions of the longitudinal shaft 3 is double that of the shafts 1, 1'. As the longitudinal shaft 3 actuates the stamps while the shafts 1, 1' actuate the device for introducing the rough iron, discharging the forged bolt, and effecting the movement of translation of the blank gripping dies it follows that the stamps finish two complete strokes while the blank gripping dies make only one movement, and the plungers do the same. This must in fact take place in order that each piece which traverses the machine may undergo two successive compressions.

The driving shafts 1, 1' operate through intermediate connections the feed plungers 4, discharge plungers 4' and gripping dies. With the said plungers I use counter-weights 5 and 5' which by bell-crank levers 6, 6' and return motion rods 7, 7' tend to keep the plungers pressed toward the interior of the machine, causing two levers 8, 8' to turn upon their fulcrums 9, 9'. In the position of Fig. 1 these two levers 8, 8' are prevented from yielding to the action of the counterweights 5, 5' by latches a, a' of the levers b, b' which are kept raised by counter-weights c, c' (Fig. 6). The aforesaid two levers 8, 8' and the plungers 4, 4' are disengaged and move toward the interior of the machine under the action of the counter-weights 5, 5' as soon as heel pieces 12, 12' provided on cams 10, 10' applied to the extremities of the driving shafts 1, 1' encounter, as they turn, the levers b, b' kept raised by the counter-weights and disengage the two levers 8, 8' from the latches a, a'.

As the driving shafts 1, 1' continue to turn, the peripheries of the aforesaid cams 10, 10' encounter shoulders 11, 11' on the two levers 8, 8' which have just turned upon their fulcrums 9, 9'. These peripheries conduct the two levers 8, 8' back to their former position (Fig. 1) raising the counter-weights 5, 5' and engaging these two levers 8, 8' with the levers b, b' under the action of the counter-weights 5, 5'.

The gripping dies compose the two parts 13 and 13' (Figs. 1 and 4) between which the bolt or rivet is pressed, while it receives the blows from the headers. These dies receive a transverse to-and-fro movement, for they must alternately be brought now opposite the stamp on the left hand side (Fig. 1) carrying the counter mold for the head of the rough bolt, and then opposite the stamp on the right hand side carrying the finishing counter mold for this head. This movement is transmitted to the dies by means of two cams 14, 14′ acting through the intervention of two rollers 15, 15′ and adjustable wedges 16 and 16′ by rods (see detail in Fig. 9) 17 and 17′ between which the dies are inclosed. It may be observed that the before-mentioned two cams 14 and 14′ do not quite fulfill the law of the constancy of the sum of the radii vectors at a given moment, for it is necessary to proportion these radii in such a manner that the gripping dies shall be strongly pressed at the moment when the stamp strikes the head of the bolt and relaxed a little while it is displaced transversely. For this reason I arrange on the two sides of the said rods 17 and 17′ bell-crank levers 19 and 19′ actuated by counterweights 18 and 18′ and designed to maintain the parts upon which these levers act in contact with the said cams 14 and 14′ as the radii thereof gradually diminish.

The longitudinal shaft 3 through the medium of a cam 20 (shown separately in Fig. 8) of rollers 21 and 21′ and adjustable wedges 22 and 22′ (see detail Fig. 10) effects the to-and-fro movement of the headers 23. The periphery of the cam 20, through the medium of the rollers 20′, 21′ causes the stamps to advance toward the central part of the machine, while a pin 24 acts upon a bell crank lever 25 (Fig. 3) for causing the stamps to move back toward the longitudinal shaft 3, as shown in full lines in Fig. 3.

The mode of operation of the machine is as follows: Into an open channel 27 (Figs. 1 and 7) is introduced the rough bar of iron which is placed opposite the feed plunger 4. At this moment the feed plunger is disengaged under the action of the beforementioned counter weight 5. The bar, as it proceeds, enters a conduit 25′ comprised between the two halves 13 and 13′ of the gripping dies. The gripping dies continuing the movement to the left, bring the bar to be forged to the left of the opening of the said channel 27 and opposite the stamp on the left hand side, which strikes it and roughly forms the head of the bolt.

By the movement of the cams 14 and 14′ the gripping dies are then transported to the right (Fig. 1). During this time one of the headers (whose driving shaft has made a complete revolution while that of the gripping dies has made only half a revolution) again strikes the bolt so as to completely finish the head. Then the gripping dies commence their backward movement to the left and the stamps also move backward toward the longitudinal shaft 3.

When the gripping dies are placed opposite the discharge plunger 4′ the latter, which already occupied the whole length of the covered channel 28 (Fig. 3) is disengaged under the action of the aforesaid counter weight 5′ and forces out the finished bolt or rivet, causing it to leave the gripping dies and fall into an empty space 26 (Fig. 3). The discharge plunger 4′ then moves back, while the feed plunger 4 prepares for another disengagement, whereupon the described phases are repeated.

There remains to be described an arrangement having the double object of limiting the forward movement of the bar introduced into said channel 27 at the time of the action of the feed plunger 4; and of preventing the departure of the feed plunger in case any obstacle may have prevented the discharge plunger from leaving previously, the object being to avoid a fresh rough bar being passed into the machine before the discharge of the previously finished piece. In order to do this a lever 29 pivoted at $29^\times$ on the frame of the machine has a depending stop spur $f$ arranged to fall in front of the path of the rough bar being introduced into the machine by the plunger 4, this position being shown in dotted lines in Fig. 2 and the bar being represented also in Fig. 1. The fall of the lever 29 is controlled by the movement of the discharge plunger mechanism as follows:

As the counter weight 5′ for the discharge plunger 4′ falls the rear end of the lever 6′ contacts with and pushes a slide 31 to the left (Fig. 5) and dotted lines Fig. 1 by means of an inclined plane 30, overcoming the resistance of a spring 31′ which tends to retain it in the position on the right hand side (Fig. 5). The incline 30 is arranged on the end of the lever and this engages a roller $31^\times$ on the slide 31. The said slide 31 carries a hook 33 which serves as a support for a lever 32 (Fig. 2). When the slide 31 moves away to the left this support will be moved away so that the lever 32 falls to the position indicated by dotted lines (Fig. 2) allowing a stay 34 which serves as a support for the lever 29 to fall also and thus permit the said lever 29 to drop and present its stop $f$ in the path of the rough blank during the discharge of the completed bolt. The falling lever 32 is returned to its previous position shown by full lines (Fig. 2) by a crank 35 mounted upon the shaft carrying the bell-crank lever 25 which effects the backward movement of the stamps.

The falling movement of the lever 29 with its stop $f$ takes place as the headers move toward the rear the arm 35 being moved by the lever 25 to the position of the dotted lines $35^\times$ Fig. 2 in order to allow this and as the headers move forward on the next operation the arm 35 is moved rearward through the lever 25 being connected to the forwardly moving header and the lever 29 is then raised before the header strikes the end of the bar held by the gripping dies 13, 13' through which the introduction of the rough bar has now been limited by the stop $f$.

For preventing the accidental operation of the feed plunger 4 before the operation of the discharge plunger 4' I use a lever 36 (Fig. 2) which prevents the movement of the lever 8 by means of a tooth $36^2$ (Fig. 2) engaging therewith. This second lever 8 when released from its catch lever $b$, can be disengaged from the lever 36 only after the fall of the lever 29; but the lever 29 in its turn can fall only when the departure of the discharge plunger 4' has caused the aforesaid stay 34 to fall. The lever 36 is operated from the said lever 29 by its projecting end $36^\times$ which extends under the lever 29 to be depressed when the latter falls.

By easily devised modifications I obtain a machine which, while preserving the positive movement of the stamps and the operation of the other parts by means of rotary shafts and the mechanism described, may be used for the rapid manufacture of large quantities of ordinary bolts and rivets which can be stamped by a single blow.

I claim as my invention—

1. In combination the pair of head forming plungers, the gripping dies comprising the two parts arranged to move transversely in front of the plungers, the cams for operating the gripping dies, the bars 17, 17', between the same and the dies, and the retracting means consisting of the weighted levers for keeping the parts of the die in loose engagement during its movement from one plunger, substantially as described.

2. In combination, the side shafts 1, 1', the feed and discharge plungers, the weighted levers 8, 8', engaging the same, the catches for releasing the weighted levers, the cams on the shafts 1, 1', for operating the catches, said cams also acting to return the levers to normal position, the heading plungers, the rear shaft 3, the cam thereon for operating the heading plungers and the transversely movable gripping dies with means for operating the same, substantially as described.

3. In combination, the feed and discharge plungers, the heading plungers, the transversely movable dies, the side shafts 1, 1', the operating connection between the same and the dies, the cams 10, 10', and the pivoted levers between the same and the feed and discharge plungers, substantially as described.

4. In combination, the laterally moving gripping dies, the driving shafts on either side having operating connections for said gripping dies, the feed and discharge plungers normally under yielding pressure, connections from the driving shafts for releasing the pressure and thereby permitting said plungers to feed or discharge the blank and also for returning the said plungers to normal position, the head forming plungers corresponding in position to the extreme positions of the laterally moving gripping dies, and means for reciprocating each plunger as the gripping dies come in line therewith, substantially as described.

5. In combination with the two head forming plungers, the laterally moving gripping dies adapted to present the blank successively to said plungers, the feed and discharge plungers and means for automatically holding the feed plunger out of operation when the discharge plunger fails to discharge the blank, substantially as described.

6. In combination with the two head forming plungers, the laterally moving gripping dies adapted to present the blank successively to said plungers, the feed and discharge plungers and the stop for the fresh bar or blank operated by the discharge plunger, substantially as described.

7. In combination the two head forming plungers, the laterally moving gripping dies adapted to present the blank successively to the plungers, and means for automatically preventing the movement of the feed plunger before the departure of the discharge plunger, substantially as described.

8. In combination, the laterally movable gripping dies, the feed and discharge plungers, means for operating them, including the weighted levers, the lever 36 engaging the operating lever of the feed plunger and the connections for operating the lever 36 from the discharge plunger, substantially as described.

9. In combination, the laterally movable gripping dies, the feed and discharge plungers, the stop $f$ for the blank being fed, the lever carrying the said stop, means for holding the lever normally up and means for releasing the said lever controlled by the discharge slide, substantially as described.

10. In combination the dies, the feed and discharge plungers, the stop for limiting the movement of the feed plunger the operating connections between said stop and the discharge plunger to be controlled by the operation thereof, means for operating the feed plunger and the controlling catch lever therefor, the said catch being controlled by the operation of the said stop and its operating connections, substantially as described.

In witness whereof I have hereunto set my hand in presence of two witnesses.

GIOVANNI PASSONI.

Witnesses:
CARLO BARJANO,
COSTANTINO GALLEANI.